United States Patent [19]

Magne et al.

[11] Patent Number: 5,031,176
[45] Date of Patent: Jul. 9, 1991

[54] CONNECTION INTERFACE OF AN INFORMATION RECEIVING PART OF A STATION IN A DIFFERENTIAL INFORMATION TRANSMISSION SYSTEM THROUGH TWO TRANSMISSION LINES, IN PARTICULAR IN AN AUTOMOBILE VEHICLE

[75] Inventors: Pierre Magne, Courbevoie; Jean-Luc Lecocq, Sevres, both of France

[73] Assignees: Automobiles Peugeot, Paris; Automobiles Citroen, Neuilly/Seine; Regie Nationale des Usines Renault, Boulogne Billancourt, all of France

[21] Appl. No.: 308,028

[22] Filed: Feb. 9, 1989

[30] Foreign Application Priority Data

Feb. 10, 1988 [FR] France ................. 88 01598

[51] Int. Cl.$^5$ .................................................. G06F 11/20
[52] U.S. Cl. ........................................ 371/8.2; 340/825.03
[58] Field of Search ................ 371/8.2, 8.1, 7, 36, 371/68.2, 68.1, 70; 340/825.01, 825.03, 827, 825.04, 825.16

[56] References Cited

U.S. PATENT DOCUMENTS

| | | | |
|---|---|---|---|
| 3,476,922 | 11/1969 | Yiotis | 371/8.2 |
| 3,609,662 | 9/1971 | Grimm | 340/168 |
| 3,803,355 | 4/1974 | Fiedler et al. | 178/68 |
| 4,165,491 | 8/1979 | Geffon | 328/150 |
| 4,245,344 | 1/1981 | Richter | 371/68.1 |
| 4,271,515 | 6/1981 | Axtell | 371/68.1 X |
| 4,792,950 | 12/1988 | Volk | 371/8.2 |

FOREIGN PATENT DOCUMENTS 53-132934  1/1979  Japan.
1314024  4/1973  United Kingdom.

*Primary Examiner*—Jerry Smith
*Assistant Examiner*—Robert W. Beausoliel
*Attorney, Agent, or Firm*—Burns, Doane, Swecker & Mathis

[57] ABSTRACT

This interface includes three comparators, the inputs of the first comparator being connected to the two transmission lines, one of the inputs of the second comparator being connected to one of the transmission lines and the other input of this comparator being connected to a bias voltage generator, one of the inputs of the third comparator being connected to the other transmission line and the other input of this comparator being connected to the bias voltage generator. The outputs of the comparators are connected to inputs of a multiplexer whose output is connected to the remainder of the circuits of the station, and the control inputs of the multiplexer are connected to the output of defect detecting means for detecting defects of one of the transmission lines so that the transmission lines control the multiplexer in such manner that the multiplexer selects the output of one of the comparators as a function of the state of the transmission lines.

14 Claims, 1 Drawing Sheet

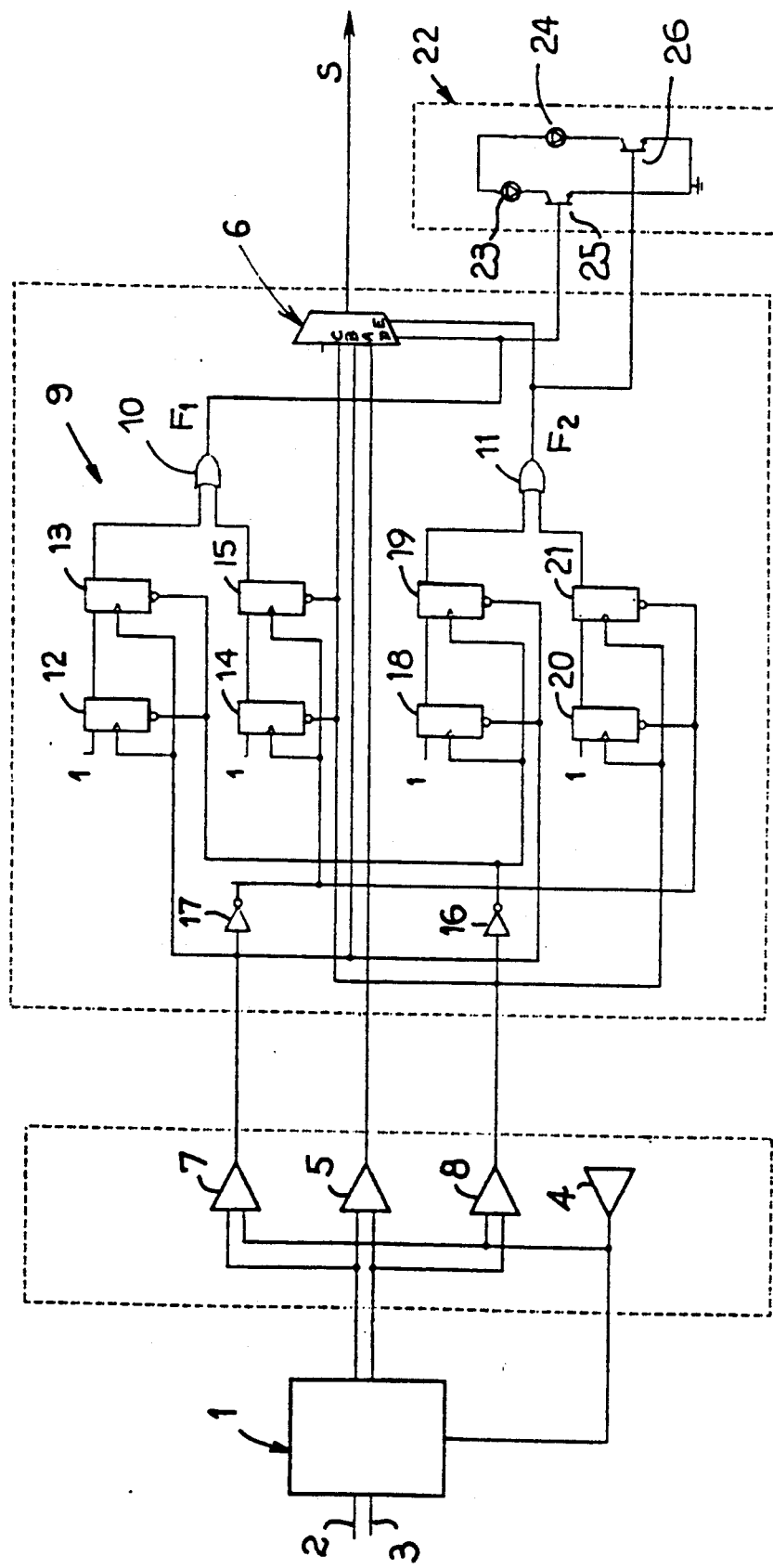

CONNECTION INTERFACE OF AN INFORMATION RECEIVING PART OF A STATION IN A DIFFERENTIAL INFORMATION TRANSMISSION SYSTEM THROUGH TWO TRANSMISSION LINES, IN PARTICULAR IN AN AUTOMOBILE VEHICLE

The present invention relates to information transmitting devices in particular in automobile vehicles, and it more particularly concerns a connection interface of an information receiving part of a station in a differential information transmitting system through two transmission lines.

A certain number of multiplexing systems are known in the art which permit connecting functions termed "body elements" to a central unit of the automobile vehicle which controls the operation.

These elements are interconnected through two information transmitting lines which thus constitute a connection bus.

For safety reasons, it is arranged that the present systems be capable of operating in a deteriorated mode, i.e. that the systems be capable of operating even if one of the two information transmitting lines is connected to the ground, to the potential of the battery or simply cut.

However, this type of devices has a number of drawbacks in that, when they operate, it is impossible to know whether they operate normally or in a deteriorated mode.

Furthermore, certain devices are also equipped with capacitive connections which do not permit, or permit with difficulty, utilizing collision dialogue systems which are still termed bus collision systems.

An object of the invention is therefore to solve these problems by proposing a connection interface which permits detecting whether one of the two transmission lines is out of order and which also permits eliminating the capacitive connection of some of the transmission devices known at the present time and therefore rendering their operation with collision buses possible.

The invention therefore provides a connection interface of an information receiving part of a station in a differential information transmitting system through two transmission lines, in particular of an automobile vehicle, said interface comprising three comparators, the inputs of the first comparator being connected to the two information transmission lines, one of the inputs of the second comparator being connected to one of the transmission lines, and the other input of this comparator to a bias voltage generator, one of the inputs of the third comparator being connected to the other transmission line and the other input of this comparator being connected to the bias voltage generator, the outputs of the comparators being connected to inputs of a multiplexer whose output is connected to the remainder of the circuits of the station, and the control inputs of the multiplexer being connected to the output of means for detecting a defect on one of the transmission lines so that the latter control the multiplexer so that it selects the output of one of the comparators as a function of the state of the information transmission lines.

Advantageously, the output of the defect detecting means is connected to storage means and/or the means indicating a defect on one of the transmission lines.

A better understanding of the invention will be had from the following description which is given solely by way of example with reference to the accompanying drawing which represents the electric diagram of a connection interface according to the invention.

As can be seen in this drawing, the connection interface according to the invention comprises filtering means 1 of known type, the input terminals of which are connected to information transmission lines 2 and 3 whereby it is possible to connect an information receiving part of a station, connected to the output of the interface, to a differential information transmission system through two lines for example installed in an automobile vehicle.

The filtering means 1 are also connected to the output of a bias amplifier 4 delivering a bias voltage to the filtering means.

The lines 2 and 3, after passage in the filtering means, are respectively connected to the non-inverting and inverting inputs of a first comparator 5 whose output is connected to an input terminal, designated by the reference A, of a multiplexer 6 whose output, S is connected to the remainder of the circuits of the receiver part of the station.

The transmission line 2, at the output of the filtering means 1, is also connected to a non-inverting input of a second comparator 7 whose other input, i.e. the inverting input, is connected to the output of the bias amplifier 4 so as to be brought to the bias potential delivered by the latter.

The output of this second comparator 7 is also directly connected to an input B of the multiplexer 6.

The transmission line 3 is connected to an inverting input of a third comparator 8, whose other input, i.e. the non-inverting input, is connected to the output of the bias amplifier 4. The output of the third comparator 8 is directly connected to an input C of the multiplexing means 6. The multiplexer also has control inputs D and E which are connected to the output of means 9 for detecting a defect on one of the transmission lines. These defect detecting means deliver a binary word controlling the multiplexer so that the latter selects the output of one of the comparators as a function of the state of the transmission lines 2 and 3 so as to obtain an undisturbed output signal, as will be described in more detail hereinafter.

The output of the detecting means 9 may also be connected to storage means and/or means for indicating a defect on one of the transmission lines so as to permit a diagnostic in real time or in deferred time of the information transmission device of the vehicle. These means will be described in more detail hereinafter.

The control inputs D and E of the multiplexer are each connected to the output of OR gates 10 and 11 respectively whose inputs are connected to flip-flops 12–15 and 18–21 connected in cascade and receiving signals from the different comparators.

Thus for example, with reference to the flip-flops 12–15 connected to the inputs of the OR gate 10 whose output is connected to the control terminal D of the multiplexer, it can be seen that each input of this gate is connected to two flip-flops connected in cascade, respectively 12 and 13 for the first input, and 14 and 15 for the second input of this gate.

These flip-flops are for example constituted by flip-flops of type D.

The flip-flop 12 receives, on one of its inputs, a logic level 1 and its output is connected to the input of the flip-flop 13 whose output is connected to one of the inputs of the OR gate 10. The driving inputs of these flip-flops receive the output signal of the second comparator 7 while the resetting inputs of these flip-flops receive the output signal of an inverter 16 whose input is connected to the output of the third comparator 8.

The driving inputs of the flip-flops 14 and 15 are connected to the output of an inverter 17 whose input is connected to the output of the second comparator 7, while the resetting inputs of these flip-flops 14 and 15 are connected to the output of the third comparator 8. The input of the flip-flop 14 is connected to a logic level 1, its output being connected to the input of the flip-flop 15 whose output is connected to the other input of the OR gate 10.

It can therefore be seen that these two pairs of flip-flops connected in parallel operate with inverted signals derived from the output signals of the comparators 7 and 8.

The control input E of the multiplexer 6 is connected to the output of an OR gate 11 whose inputs are also connected to two pairs of D flip-flops connected in cascade and carrying the reference characters 18, 19 and 20, 21 respectively. These pairs of flip-flops are also connected in parallel to the inputs of the OR gate 11.

The driving inputs of the flip-flops 18 and 19 are connected to the output of the inverter 16, while the resetting inputs of these flip-flops are directly connected to the the output of the second comparator 7.

The driving inputs of the flip-flops 20 and 21 are directly connected to the output of the third comparator 8, while the resetting inputs of these flip-flops are connected to the output of the inverter 17. The other inputs of the flip-flops 18 and 20 are connected to a logic level 1, their outputs being connected to the inputs of the flip-flops 19 and 21 whose outputs are connected to the inputs of the OR gate 11. It will also be understood that the pairs of flip-flops 18, 19 and 20, 21 respectively operate with inverted signals derived from the output signals of the comparators 7 and 8.

The defect detecting means 9 therefore comprise four pairs of two flip-flops arranged in cascade and connected in parallel in pairs, each pair receiving driving signals and resetting signals which are inverted relative to those received by the corresponding flip-flop of the associated pair.

Thus it appears that the operation of such a circuit permits the detection of a failure on one or the other of the transmission lines 2 or 3, in that the driving signals of the flip-flops are constituted by (direct or inverted) signals on one of the lines, while the resetting signals of these flip-flops are constituted by (direct or inverted) signals on the other line.

Inasmuch as the device operates in a normal manner, i.e. in a differential manner, there are therefore found on the lines 2 and 3 two signals which are inverted with respect to each other. The signals circulating on one of the lines serve to drive one of the flip-flops, while signals circulating on the other line serve to reset the flip-flops.

In the event of a defect in the transmission on either of the transmission lines, the corresponding flip-flops are not reset and there is therefore found at the output of the concerned pairs of flip-flops a logic level 1 which is also at the output of the flip-flop 10 or 11, i.e. at F1 or F2, these outputs being connected to the control inputs D and E of the multiplexer 6 for the purpose of causing the latter to select the output of one of the comparators as a function of the state of the transmission lines.

The following table illustrates the various possibilities of the interface according to the invention.

| F1=0 | F2=0 | no defect → | the result of the first |
| D=0 | E=0 | | comparator 5 is at the output of the multiplexer |
| F1=0 | F2=1 | defect on line 2 → | the result of the third comparator 8 is at the |
| D=0 | E=1 | | output of the multiplexer |
| F1=1 | F2=0 | defect on line 3 → | the result of the second comparator 7 is at the |
| D=1 | E=0 | | output of the multiplexer |

Thus it can be seen from this table that when two inverted signals circulate on the lines 2 and 3, they are mutually neutralized so that at the output of the flip-flops 10 and 11 there is a binary word 00, this binary word driving the multiplexer so that the latter connects its input terminal A to its output S so as to deliver at the output to the rest of the circuits of the station the output signal of the comparator 5.

On the other hand, in the event of a defect on the line 2, the output F2 of the gate 11 changes to 1. And the binary word 01 is therefore applied to the inputs D, E of the multiplexer 6 so that the latter connects its input C to its output so as to select the output of the third comparator 8.

In the event of a defect on line 3, the output F1 or the gate 10 charges to 1 and the binary word 1 O is applied to the controlling inputs D, E of the multiplexer so that the latter connects its input B to its output and thus selects the output of the second comparator 7.

The signals present at the output of comparators 7 and 8 represent the signals circulating on the lines 2 and 3 respectively, it being impossible to disturb these signals by possible defects on the other line owing to the separation of the analysis thereof in the two different comparators driven by a bias voltage.

In order to facilitate the diagnosis and the repairs of the transmission device of the vehicle when the latter has defects, defect indicating means 22 may also be connected to the output of the defect detecting means 9. These defect indicating means 22 may comprise two lights 23 and 24 connected in the collector circuits of the transistors 25, 26 whose bases are respectively connected to the output F1 of the OR gate 10 and to the output F2 of the OR gate 11.

These lights indicate the existence of a defect on either of the transmission lines, for example to a user of the vehicle or to a person in charge of its maintenance. It will be understood that these indicating means may be replaced by defect storing means, it being possible to read these storing means by suitable diagnosis equipment.

We claim:
1. A connection interface of an information receiving part of a station in a differential information transmission system through two transmission lines, in particular of an automobile vehicle, said interface comprising three comparators, a first comparator having inputs connected to the two transmission lines, a second comparator having an input connected to one of the transmission lines and another input connected to a bias voltage generator, a third comparator having an input connected to the other transmission line and another input connected to the bias voltage generator, the comparators having outputs connected to inputs of a multiplexer which has an output connected to a remainder of the circuits of said station, and the multiplexer having control inputs connected to an output of means for detecting a defect on one of said transmission lines, so that said transmission lines so control the multiplexer that the multiplexer selects the output of one of the comparators as a function of the state of said transmission lines, wherein the defect detection means comprises a first pair of flip-flops connected in cascade and connected to one of the control inputs of the multiplexer, said first pair of flip-flops having driving inputs connected to the output of the second comparator and resetting inputs connected to an output of an inverter which has an input connected to the output of the third comparator, and a second pair of flip-flops connected in cascade and connected to the other control input of the multiplexer, said second pair of flip-flops having driving inputs connected to the output of the third comparator and resetting inputs connected to the output of an inverter which has an input connected to the output of the second comparator, and wherein the defect detection means further comprises third and fourth pairs of flip-flops connected in cascade and respectively connected in parallel to the first and second pairs of flip-flops and receiving on driving inputs and resetting inputs thereof respectively signals which are inverted relative to those received by the corresponding inputs of the pair of flip-flops with which each one thereof is associated.

2. A connection interface according to claim 1, wherein the output of the defect detection means is connected to storage means.

3. A connection interface according to claim 2, wherein the output of the defect detection means is also connected to means for indicating a defect on one of the transmission lines.

4. A connection interface according to claim 2, wherein the defect indicating means comprise lamps connected in a collector circuit of transistors which have bases connected to the control inputs of the multiplexer so as to indicate the existence of a defect on one and/or the other of the transmission lines.

5. A connection interface according to claim 1, wherein the output of the defect detection means is connected to means for indicating a defect on one of the transmission lines.

6. A connection interface according to claim 1, wherein the outputs of the associated pairs of flip-flops are connected to inputs of an OR gate which has an output connected to a control input of the multiplexer.

7. A connection interface according to claim 1, wherein the storage means comprise lamps connected in a collector circuit of transistors which have bases connected to the control inputs of the multiplexer so as to indicate the existence of a defect on one and/or the other of the transmission lines.

8. A connection interface of an information receiving part of a station in a differential information transmission system through two transmission lines, in particular of an automobile vehicle, said interface comprising:
three comparators each having an output, a first comparator having inputs connected to the two transmission lines, a second comparators having an input connected to one of the transmission lines and another input connected to a bias voltage generator, a third comparator having an input connected to an second of the transmission line and another input connected to the bias voltage generator;
a multiplexer having control inputs, a plurality of inputs connected to the output of the comparators and an output connected to a remainder of the circuits of said station;
means for detecting a defect on one of said transmission lines having an output connected to the control inputs of the multiplexer, such that said transmission lines control the multiplexer such that the multiplexer selects the output of one of the comparators as a function of a state of said transmission lines;
said defect detecting means comprising
a first pair of flip-flops connected in cascade and connected to one of the control inputs of the multiplexer, said first pair of flip-flops having driving inputs connected to the output of the second comparator and resetting inputs connected to an output of an inverter which has an input connected to the output of the third comparator,
a second pair of flip-flops connected in cascade and connected to the other control input of the multiplexer, said second pair of flip-flqps having driving inputs connected to the output of the third comparator and resetting inputs connected to the output of an inverter which has an input connected to the output of the second comparator,
third and fourth pairs of flip-flops connected in cascade and respectively connected in parallel to the first and second pairs of flip-flops and receiving, through driving inputs and resetting inputs thereof, respectively, signals which are inverted relative to those received by the corresponding inputs of the first or second pair of flip-flops with which each of the third and fourth pair of flip-flops is connected.

9. A connection interface according to claim 8, further comprising storage means connected to the output of the defect detecting means.

10. A connection interface according to claim 9, further comprising means for indicating a defect on one of the transmission lines connected to the output of the defect detecting means.

11. A connection interface according to claim 9, wherein the storage means comprise lamps connected in a collector circuit of transistors which have bases connected to the control inputs of the multiplexer so as to indicate the existence of a defect on one and/or other of the transmission lines.

12. A connection interface according to claim 8, further comprising means for indicating a defect on one of the transmission lines connected to the output of the defect detecting means.

13. A connection interface according to claim 12, wherein the defect indicating means comprise lamps connected in a collector circuit of transistors which have bases connected to the control inputs of the multiplexer so as to indicate the existence of a defect on one and/or the other of the transmission lines.

14. A connection interface according to claim 8, further comprising two OR gates each having inputs connected to the outputs of associated pairs of flip-flops and an output connected to a control input of the multiplexer.

* * * * *